United States Patent
Humphrys et al.

(10) Patent No.: US 11,361,321 B2
(45) Date of Patent: Jun. 14, 2022

(54) SYSTEM AND METHOD FOR SELF-SERVICE RETURNS

(71) Applicant: Walmart Apollo, LLC, Bentonville, AR (US)

(72) Inventors: Douglas Humphrys, Bentonville, AR (US); Tina M. Kurtz, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 386 days.

(21) Appl. No.: 15/481,844

(22) Filed: Apr. 7, 2017

(65) Prior Publication Data
US 2017/0293916 A1    Oct. 12, 2017

Related U.S. Application Data

(60) Provisional application No. 62/320,134, filed on Apr. 8, 2016.

(51) Int. Cl.
*G06Q 40/00* (2012.01)
*G06Q 20/40* (2012.01)
(Continued)

(52) U.S. Cl.
CPC ......... *G06Q 20/407* (2013.01); *G06Q 20/10* (2013.01); *G06Q 20/18* (2013.01);
(Continued)

(58) Field of Classification Search
CPC ...... G06Q 20/407; G06Q 20/10; G06Q 20/18; G06Q 20/4014; G06Q 30/016
See application file for complete search history.

(56) References Cited

U.S. PATENT DOCUMENTS

| 6,595,342 | B1 * | 7/2003 | Maritzen ......... G06Q 20/40145 194/906 |
| 6,744,938 | B1 * | 6/2004 | Rantze .................. G06Q 30/06 382/312 |

(Continued)

FOREIGN PATENT DOCUMENTS

| WO | 9964979 | 12/1999 | |
| WO | WO-2004067286 A2 * | 8/2004 | ............. B41J 3/445 |

(Continued)

OTHER PUBLICATIONS

PiBiNi, "How to Return Items to Amazon," published on youtube.com Oct. 22, 2015 (Year: 2015).*

(Continued)

*Primary Examiner* — Alexander G Kalinowski
*Assistant Examiner* — William B. Bunker
(74) *Attorney, Agent, or Firm* — Fitch, Even, Tabin & Flannery LLP

(57) ABSTRACT

Systems, apparatuses, and methods are provided herein for processing a merchandise return transaction. A system for processing a merchandise return transaction comprising: a user interface for allowing direct entry of information by a customer without assistance from a worker; a database; and a control circuit coupled to the user interface and the database, the control circuit configured to execute the return transaction by: obtaining from the customer identifier relating to a purchase transaction in which at least one item was previously purchased; identifying a product item from the purchase transaction to be returned; obtaining from the customer a reason for the product item to be returned; obtaining from the customer a preferred tender for the return transaction; authorizing the return; and providing instructions to the customer for returning the product item to a retail facility.

10 Claims, 3 Drawing Sheets

(51) Int. Cl.
  *G06Q 20/18* (2012.01)
  *G06Q 20/10* (2012.01)
  *G06Q 30/00* (2012.01)
  *G07F 7/06* (2006.01)

(52) U.S. Cl.
  CPC ....... *G06Q 20/4014* (2013.01); *G06Q 30/016* (2013.01); *G07F 7/06* (2013.01)

(56) References Cited

U.S. PATENT DOCUMENTS

| | | | | |
|---|---|---|---|---|
| 7,455,226 | B1* | 11/2008 | Hammond | G06Q 20/202 705/28 |
| 7,617,133 | B1* | 11/2009 | Antony | G06Q 10/08 705/26.7 |
| 8,156,007 | B1* | 4/2012 | Anthony | G06Q 10/0837 705/22 |
| 8,311,895 | B1* | 11/2012 | Murugan | G06Q 50/28 705/26.1 |
| 8,386,337 | B2 | 2/2013 | Siegel | |
| 8,635,168 | B2 | 1/2014 | Junger | |
| 9,692,738 | B1* | 6/2017 | Wenneman | H04L 63/08 |
| 9,697,548 | B1* | 7/2017 | Jaff | G06Q 30/0601 |
| 9,922,488 | B2* | 3/2018 | Joshi | G07F 9/001 |
| 10,430,753 | B2* | 10/2019 | Felix | G06Q 10/0837 |
| 10,733,578 | B2* | 8/2020 | Ezell | G06Q 10/30 |
| 2001/0037207 | A1* | 11/2001 | Dejaeger | G06Q 30/06 705/304 |
| 2002/0019783 | A1 | 2/2002 | Choi | |
| 2002/0019785 | A1* | 2/2002 | Whitman | G06Q 10/087 705/28 |
| 2002/0046056 | A1 | 4/2002 | Demarco | |
| 2007/0276686 | A1* | 11/2007 | Hunscher | G06Q 20/34 705/39 |
| 2011/0087606 | A1* | 4/2011 | Hammond | G06Q 10/06 705/304 |
| 2015/0363749 | A1* | 12/2015 | Buscher | G06Q 20/18 705/305 |
| 2016/0042351 | A1* | 2/2016 | Syed | H04W 4/021 705/39 |
| 2016/0098690 | A1* | 4/2016 | Silva | G06Q 30/0201 705/21 |
| 2016/0099590 | A1* | 4/2016 | Velderman | G07F 7/06 320/113 |

FOREIGN PATENT DOCUMENTS

| | | | | |
|---|---|---|---|---|
| WO | WO-2010032253 | A2 * | 3/2010 | ........... G06Q 30/02 |
| WO | WO-2013058978 | A1 * | 4/2013 | ........... A61B 5/1079 |

OTHER PUBLICATIONS

Ganesh et al., "Web Services and Multi-Channel Integration: A Proposed Framework," Proceeding of IEEE International Conference on Web Services, Jan. 1, 2004. (Year: 2004).*

BT Shop; "How Do I Arrange a Return?"; http://www.shop.bt.com/help/returns-and-refunds/how-do-i-arrange-a-return/; Feb. 1, 2016; pp. 2.

Ebuyer; "Returns Help"; http://www.ebuyer.com/help/returns; Feb. 1, 2016; pp. 14.

Adidas International Trading B.V.; "Return Inquires"; http://www.adidas.co.uk/help/return.html; Feb. 1, 2016 pp. 4.

Dudley, Nat; "Daily In-Store Processes—Sales, Returns and More"; https://support.vendhq.com/hc/en-us/articles/203062440-Daily-In-Store-Processes-Sales-Returns-and-More#return; Feb. 1, 2016; pp. 46.

\* cited by examiner

SYSTEM AND METHOD FOR SELF-SERVICE RETURNS

RELATED APPLICATION

This application claims the benefit of U.S. Provisional Application No. 62/320,134, filed Apr. 8, 2016, which is incorporated herein by reference in its entirety.

TECHNICAL FIELD

The field of this invention relates generally to systems and methods for buyers to return merchandise purchased from a retailer.

BACKGROUND

In a modern retail environment, there is a need to improve the customer service experience and/or convenience for the customer. One aspect of customer service is the return of retail items purchased by the customer. When a customer purchases a retail item in-store from a retailer and later wants to return the retail item, the customer is often required to travel to one of the retailer's stores, where the return transaction is processed by a store worker. The reliance on a store worker to process return transactions can result in undesirable delays for the customer, can add cost, and can reduce revenue.

BRIEF DESCRIPTION OF THE DRAWINGS

Disclosed herein are embodiments of systems, apparatuses and methods pertaining to returning merchandise purchased from a retailer. This description includes drawings, wherein.

Figure 1:
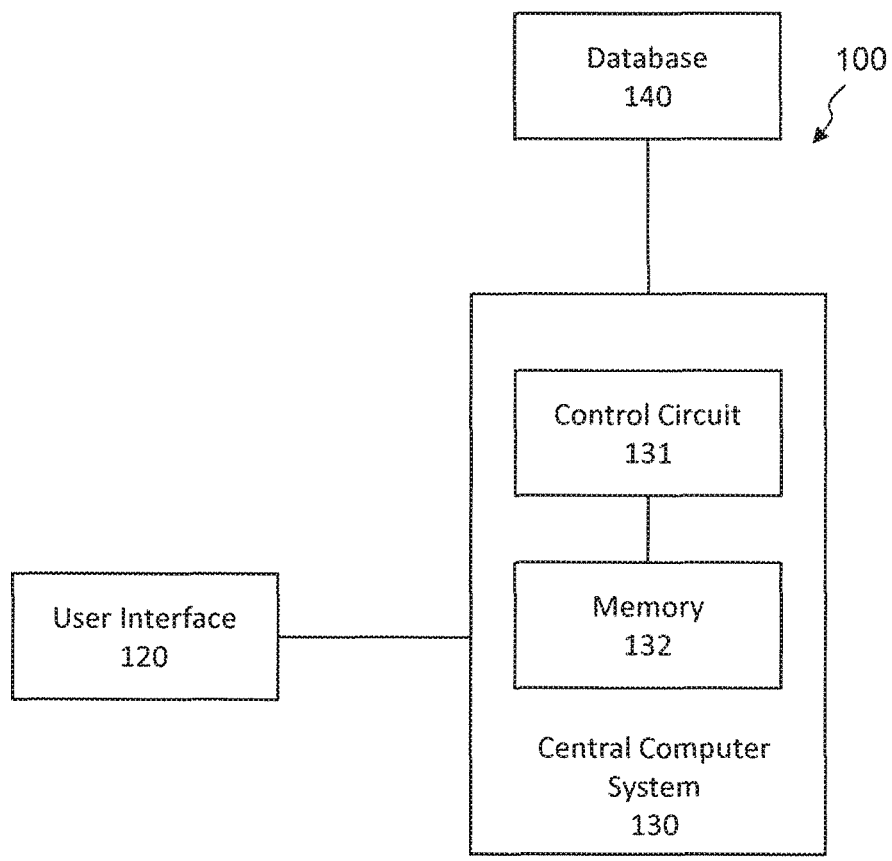
FIG. 1 illustrates a simplified block diagram of an exemplary merchandise return system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

Generally speaking, pursuant to various embodiments, systems, apparatuses and methods are provided herein useful to process merchandise return transactions. In some embodiments, systems and methods for processing a merchandise return transaction are provided. In some embodiments, systems are provided that include a user interface for allowing direct entry of information by a customer without assistance from a worker. The system may include a database containing data relating to purchase transactions, product information, store policies, warranty information, and customer profiles. A control circuit coupled to the user interface and the database may be provided. The control circuit may be configured to execute the return transaction by obtaining from the customer, via the user interface, an identifier relating to a purchase transaction in which at least one item was previously purchased. In some embodiments, the identifier relating to the purchase transaction may comprise at least one of an image of a purchase receipt, an e-receipt, an order number, a customer number, a UPC code, a credit card number, a telephone number, an email address, and a mailing address.

The control circuit may then identify a product item from the purchase transaction to be returned, obtain from the customer, via the user interface, a reason for the product item to be returned, and obtain from the customer, via the user interface, a preferred tender for the return transaction. The control circuit may then authorize the return by analyzing data relating to at least one of purchase transactions, product information, store policies, warranty information, and customer profiles, and providing instructions to the customer for returning the product item to a retail facility.

In some embodiments, the system may include an electronic device, such as, for example, a personal computer, a laptop computer, a handheld communication device, an in-store kiosk, or a remote-location kiosk, from which the customer can access the user interface. The system may also include a server coupled to the user interface and control circuit, which may allow the return transaction to be initiated by the customer via the user interface from a location that is different from a location of the retail facility where the product item is to be returned. In some embodiments, the customer may access the user interface from an electronic device in communication with the server.

In some embodiments, the location of the retail facility where the product item is to be returned may be different from a location of a retail facility from which the product item was purchased. In some embodiments, the customer may be instructed to deliver the product item to an unattended drop-off area of the retail facility. In some embodiments, customer may be instructed to deliver the product item to an area of the retail facility that is attended by a worker, and the worker verifies the product item to be returned.

In some embodiments, authorizing the return does not require assistance by a worker. In some embodiments, the entire return transaction may be performed independently by a customer such that assistance by a worker is not required.

Figure 2:
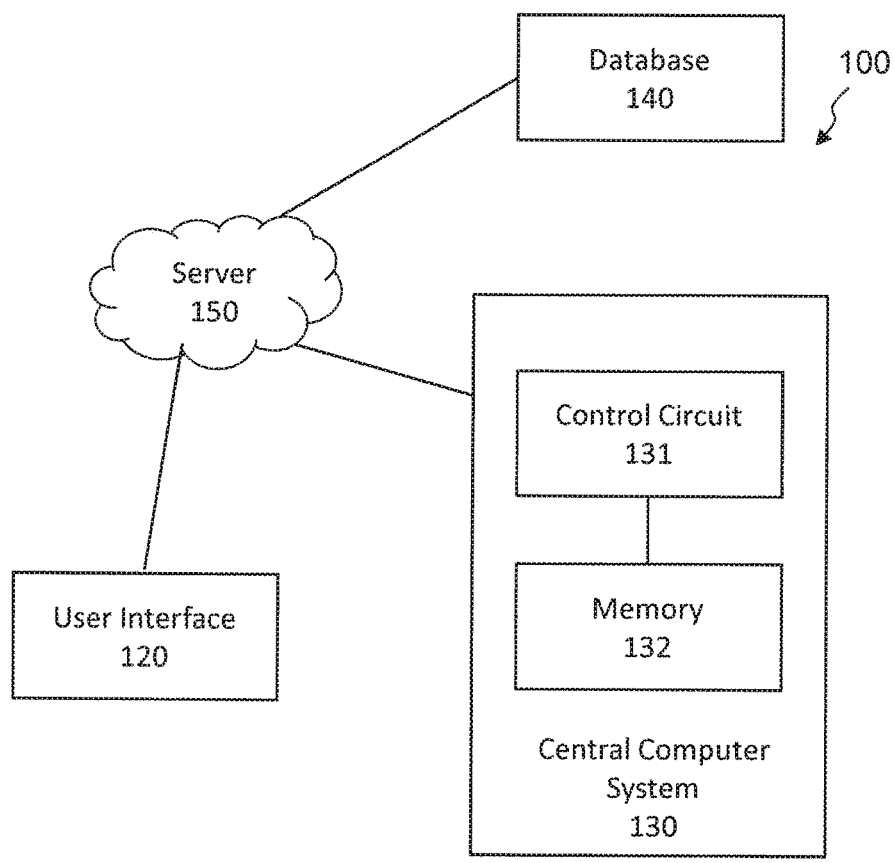
FIG. 2 illustrates a simplified block diagram of an exemplary merchandise return system, in accordance with some embodiments.

FIGS. 1 and 2 illustrate simplified block diagrams of exemplary merchandise return system 100, in accordance with some embodiments. The merchandise return system includes a user interface 120, database 140, and a central computer system 130 that is communicatively coupled with the user interface 120 and the database 140.

The user interface 120 may generally be configured to allow direct entry of information by a customer without assistance from a worker. In some embodiments, the user interface 120 may comprise a touch screen display. In some embodiments, the user interface 120 may display actionable elements through which a customer may make selections during the return transaction. In some embodiments, the user interface 120 may be part of an in-store kiosk or a remote-location kiosk, which may also include additional components, such as, for example, a barcode reader, an image scanner, and/or any component that allows direct entry of information by a customer without assistance from a worker. In some embodiments, the user interface 120 may be displayed on an electronic mobile device, such as, for example, a personal computer, a laptop computer, or a handheld communication device such as a mobile phone or tablet or the like. In some embodiments, the electronic device may be selected from the group consisting of a personal computer, a laptop computer, a handheld communication device, an in-store kiosk, and a remote-location kiosk.

The database 140 generally comprises volatile and/or non-volatile computer readable storage memory device(s). While the database 140 is shown as a separate component from the memory 132 of the central computer system 130 in FIG. 1, in some embodiments, the database 140 and the memory 132 may be implemented with the same one or more memory devices. The database 140 may generally store data relating to, for example, purchase transactions, product information, store policies, warranty information, customer profiles, inventory, and/or other such information.

The central computer system 130 may include a control circuit 131 and a memory 132 and may generally be any processor-based device such as one or more of a computer system, a server, a networked computer, a cloud-based server, etc. The control circuit 131 may comprise a central processing unit, a processor, a microprocessor, and the like. The control circuit 131 may be configured to execute computer readable instructions stored on the memory 132. The memory 132 may comprise volatile and/or non-volatile computer readable storage memory and have stored upon it a set of computer readable instructions which, when executed by the control circuit 131, causes the system to display prompts and/or instructions on the user interface and to execute instructions for processing merchandise returns. The central computer system 130 may be coupled to the user interface 120 and database 140 via a wired and/or wireless signal connections.

In some embodiments, as shown in FIG. 2, the system may optionally include and/or communicatively couple with a server 150 in communication with the user interface 120, database 140, and central computer system 130. The server 150 may generally be configured to allow the return transaction to be initiated by the customer via the user interface 120 from a location that is different from a location of the retail facility where the product item is to be returned such that the customer may initiate the return transaction remotely from a location other than the location of the retail facility where the product item is to be returned. For example, the server 150 may allow a customer to initiate the return transaction remotely using an electronic device, such as, for example, a personal computer, a laptop computer, a handheld communication device such as a mobile phone or tablet or the like, a remote kiosk, or any other electronic device that is capable of communicating with server 150. Such a configuration allows a customer to initiate the return transaction process remotely, for example, at home, providing convenience to the customer and reducing time spent waiting in a returns line at the recital facility.

In some embodiments, the central computer system 130 may display a prompt to the customer, via the user interface 120, to provide an identifier relating to a purchase transaction in which at least one item was previously purchased. The identifier may include, for example, an image of a purchase receipt, an e-receipt, an order number, a customer number, a UPC code, a credit card number, a telephone number, an email address, a mailing address, or any other information that may identify the purchase transaction. In some embodiments, the customer may manually input one or more identifiers via the user interface 120. In some embodiments, the user interface 120 may prompt the customer to scan, or otherwise provide an image of, the purchase receipt.

The central computer system 130 may be configured to correlate the one or more identifiers provided by the customer to one or more product items associated with a previous purchase transaction. The central computer system 130 may then identify one or more product items to be returned. In some embodiments, the central computer system 130 may automatically identify a product item to be returned based on the one or more identifiers provided by the customer. In some embodiments, the central computer system 130 may prompt the customer, via the user interface 120, to identify or select one or more product items to be returned and/or to provide additional product information. For example, the customer may manually enter or scan product information, via the user interface 120, or the customer may select a product item from a list of product items displayed on the user interface 120.

The central computer system 130 may then display a prompt to the customer, via the user interface 120, to provide a reason for the product item to be returned. For example, the customer may select, via the user interface 120, a reason for the product item to be returned from a list of reasons displayed on the user interface 120. In some embodiments, the customer may input, via the user interface 120, a reason for the product item to be returned.

The central computer system 130 may then prompt the customer, via the user interface 120, to select a preferred tender for the return transaction. For example, the customer may choose to receive a refund as cash, store credit, a gift card, or, if a credit card or debit card was used to pay for the product item, a credit to the customer's credit card or debit card account.

The central computer system 130 may then authorize the return by analyzing data relating to, for example, purchase transactions, product information, store policies, warranty information, and customer profiles. In some embodiments, the central computer system 130 may automatically complete the authorization process without the assistance of a store worker. In other embodiments, the central computer system 130 may require the assistance of a store worker to complete the authorization process or to decline the return. For example, the central computer system 130 may determine that the information provided by the customer may be inconsistent with previous purchase transaction data and/or product information, or the attempted product return may be incompatible with store return policies and/or product warranty requirements. In such cases, worker assistance may be needed to resolve any discrepancies and/or to decline the return. In some cases, the central computer system 130 may be configured to flag high-value product items and/or high risk product items to require worker intervention in order to complete the authorization process.

In embodiments where the user interface 120 is part of a self-service kiosk in the retail facility, the central computer system 130 may be configured to automatically alert a store worker to attend to the kiosk to provide assistance. The alert may be in the form of, for example, an indicator light and/or sound alert. In some embodiments, central computer system 130 may be configured to automatically send an alert or text notification to a worker's computer screen display or handheld device to request assistance with the return transaction. In embodiments where the user interface 120 is part of a mobile electronic device, such as, for example, a personal computer, a laptop computer, a handheld communication device such as a mobile phone or tablet or the like, the central computer system 130 may cause the user interface 120 to prompt the customer to travel to a retail facility location and to complete the authorization with the assistance of a store worker. In some embodiments, the worker may provide or decline authorization via the user interface 120. In other embodiments, the worker may provide or decline authorization via a separate user interface.

If the return transaction is authorized, the central computer system 130 may be configured to cause the user interface 120 to display instructions to the customer for returning the product item to a retail facility. For example, the customer may be instructed to return the product item the same retail facility location from where the product item was purchased. In other embodiments, the customer may be instructed to return the product item to any retail facility location. In some embodiments, the customer may be instructed to deliver the product item to an area of the retail facility that is attended by a worker. In such cases, the worker receives and verifies the product item to be returned in the presence of the customer. In other embodiments, the system may instruct the customer to deliver the product item to an unattended drop-off area of the retail facility. In such cases, a store worker, at a later time, may collect the returned product item from the unattended drop-off area of the retail facility for further processing through the returned inventory chain.

In some embodiments, the computer system 130 may be configured to cause a printer to print, or may otherwise direct or enable the customer to print, a return label which may include a unique identifier, such as, for example, a barcode, linked to the return order, which the customer may affix to the product item to be returned. In some embodiments, the customer may print the return label remotely at a location other than the location where the product item is to be returned. In some embodiments, the customer may print the return label at an in-store kiosk. After the customer has delivered their labeled product item to be returned to the unattended drop-off area of the retail facility, an associate, at a later time after the customer is no longer present at the drop-off area, may then scan, or may otherwise input into the system, the unique identifier on the return label to retrieve information relating to the return transaction. In some embodiments, the associate may approve the return transaction after the customer has departed the drop-off area and/or the retail facility.

In some embodiments, the computer system 130 may be configured to allow the entire return transaction to be performed independently by the customer such that assistance by a worker is not required.

Figure 3:
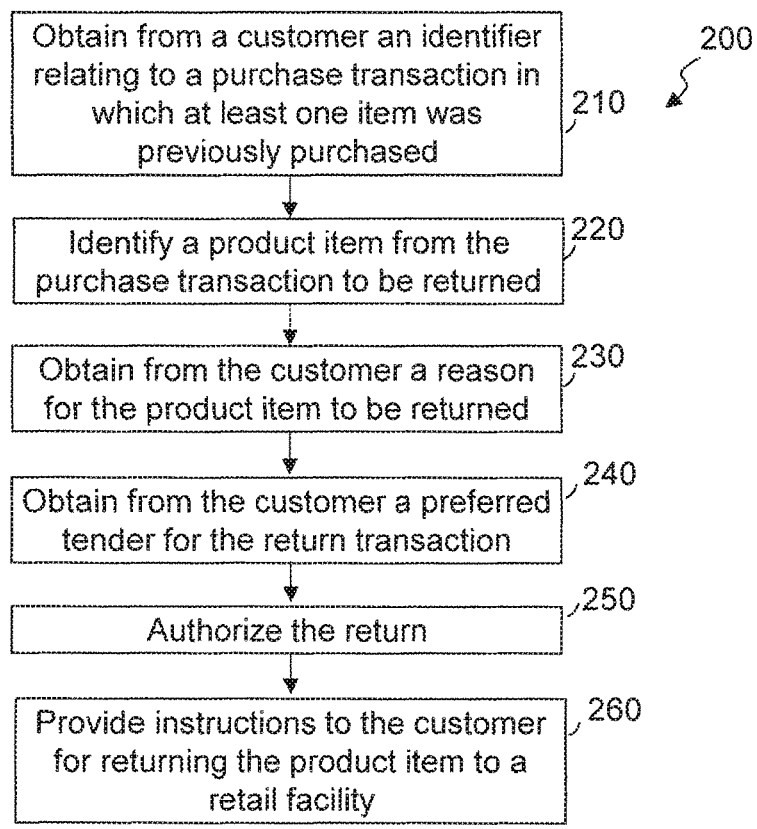
FIG. 3 illustrates a simplified flow diagram of a process for processing merchandise returns, in accordance with some embodiments.

Referring now to FIG. 3, a method for processing merchandise return transactions is shown. Generally, the method shown in FIG. 3 may be implemented with a processor based device such as a control circuit, a central processor, and the like. In some embodiments, the method shown in FIG. 3 may be implemented with the central computer system 130 in FIGS. 1 and 2.

In step 210, the system obtains from a customer an identifier relating to a purchase transaction in which at least one item was previously purchased. The customer may input, via a user interface, an identifier relating to a purchase transaction, such as, for example, an image of a purchase receipt, an e-receipt, an order number, a customer number, a UPC code, a credit card number, a telephone number, an email address, a mailing address, or any other information that may identify the purchase transaction. The user interface may comprise the user interface 120 described with reference to FIGS. 1 and 2. In some embodiments, the customer may access the user interface on an electronic device. In some embodiments, the electronic device may be selected from the group consisting of a personal computer, a laptop computer, a handheld communication device, an in-store kiosk, and a remote-location kiosk. In some embodiments, the customer may manually input one or more identifiers via the user interface. In some embodiments, the user interface may prompt the customer to scan, or otherwise provide an image of, the purchase receipt. The system may correlate the one or more identifiers provided by the customer to one or more products associated with a previous purchase transaction.

In step 220, the system may identify a product item from the purchase transaction to be returned. In some embodiments, the system may automatically identify the product item to be returned based on previous information provided by the customer. In some embodiments, the customer may identify or select one or more product items to be returned. For example, the customer may manually enter or scan product information via the user interface, or the customer may select a product item from a list of product items displayed on the user interface.

In step 230, the system may obtain from the customer a reason for the product item to be returned. In some embodiments, the system may display a prompt to the customer, via the user interface, to provide a reason for the product item to be returned. For example, the customer may select reason for the product item to be returned from a list of reasons displayed on the user interface, or, in some embodiments, the customer may manually input a reason for the product item to be returned.

In step 240, the system may obtain from the customer a preferred tender for the return transaction. In some embodiments, system may prompt the customer, via the user interface, to select a preferred tender for the return transaction. For example, the customer may choose to receive a refund as cash, store credit, a gift card or, if a credit or debit card was used to pay for the product item, a credit to the customer's credit card or debit card account.

In step 250, the system may authorize the return of the product item. In some embodiments, the system may authorize a return by analyzing data relating to, for example, purchase transactions, product information, store policies, warranty information, and customer profiles. In some embodiments, the system may automatically complete the authorization process without the assistance of a store worker. In other embodiments, the system may require the assistance of a store worker to complete the authorization process or to decline the return. For example, system may determine that the information provided by the customer may be inconsistent with previous purchase transaction data and/or product information, or the attempted product return may be incompatible with store return policies and/or product warranty requirements. In such cases, worker assistance may be needed to resolve any discrepancies and/or to decline the return. In some cases, the system may flag high-value product items and/or high risk product items to require worker intervention in order to complete the authorization process.

In embodiments where the user interface used by the customer is part of a self-service kiosk in the retail facility, the system may automatically alert a store worker to attend to the kiosk to provide assistance. The alert may be in the form of, for example, an indicator light and/or sound alert. In some embodiments, the system may automatically send an alert or text notification to a worker's computer screen display or handheld device to request assistance with the return transaction. In embodiments where the user interface used by the customer is part of a mobile electronic device, such as, for example, a personal computer, a laptop computer, a handheld communication device such as a mobile phone or tablet or the like, system may instruct the customer, via the user interface, display to travel to a retail facility location and to complete the authorization with the assistance of a store worker. In some embodiments, the worker may provide or decline authorization via the same user interface used by the customer. In other embodiments, the worker may provide or decline authorization via a separate user interface.

In step 260, if the return transaction is authorized, the system may provide instructions, via the user interface, to the customer for returning the product item to a retail facility. For example, the customer may be instructed to return the product item the same retail facility location from where the product item was purchased. In other embodiments, the customer may be instructed to return the product item to any retail facility location. In some embodiments, the customer may be instructed to deliver the product item to an area of the retail facility that is attended by a worker. In such cases, the worker receives and verifies the product item to be returned in the presence of the customer. In other embodiments, the system may instruct the customer to deliver the product item to an unattended drop-off area of the retail facility. In such cases, a store worker, at a later time, may collect the returned product item from the unattended drop-off area of the retail facility for further processing through the returned inventory chain.

In some embodiments, the system may print, or may otherwise direct or enable the customer to print, a return label which may include a unique identifier, such as, for example, a barcode, linked to the return order, which the customer may affix to the product item to be returned. In some embodiments, the customer may print the return label remotely at a location other than the location where the product item is to be returned. In some embodiments, the customer may print the return label at an in-store kiosk. After the customer has delivered their labeled product item to be returned to the unattended drop-off area of the retail facility, an associate, at a later time after the customer is no longer present at the drop-off area, may then scan, or may otherwise input into the system, the unique identifier on the return label to retrieve information relating to the return transaction. In some embodiments, the associate may approve the return transaction after the customer has departed the drop-off area and/or the retail facility.

In some embodiments, the entire return transaction may be performed independently by the customer such that assistance by a worker is not required.

In one embodiment, a system for processing a merchandise return transaction comprises: a user interface for allowing direct entry of information by a customer without assistance from a worker; a database containing data relating to purchase transactions, product information, store policies, warranty information, and customer profiles; and a control circuit coupled to the user interface and the database, the control circuit configured to execute the return transaction by: obtaining from the customer, via the user interface, an identifier relating to a purchase transaction in which at least one item was previously purchased; identifying a product item from the purchase transaction to be returned; obtaining from the customer, via the user interface, a reason for the product item to be returned; obtaining from the customer, via the user interface, a preferred tender for the return transaction; authorizing the return by analyzing data relating to at least one of purchase transactions, product information, store policies, warranty information, and customer profiles; and providing instructions to the customer for returning the product item to a retail facility.

In one embodiment, a method for processing a merchandise return transaction comprises: obtaining from a customer, via a user interface for allowing direct entry of information by a customer without assistance from a worker, an identifier relating to a purchase transaction in which at least one item was previously purchased; identifying a product item from the purchase transaction to be returned; obtaining from the customer, via the user interface, a reason for the product item to be returned; obtaining from the customer, via the user interface, a preferred tender for the return transaction; authorizing the return by analyzing data relating to at least one of purchase transactions, product information, store policies, warranty information, and customer profiles, said data being contained in a database; and providing instructions to the customer for returning the product item to a retail facility.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for processing an in-store merchandise return transaction for a retail item purchased by a customer in-store from one of a plurality of retail facilities of a retailer, the system comprising:
  a fully automated in-store self-service kiosk located within one of the plurality of retail facilities, wherein the kiosk is not staffed by any employee of the retailer and is located in an area of the retail facility accessible by the customer in possession of the item, the self-service kiosk comprising:
    a reader configured to identify a purchase transaction of the item to be returned; and
    a user interface configured to allow a customer to enter information using the reader or a touchscreen display relating to the purchase transaction of the item to be returned;

a database containing data relating to purchase transactions, product information, store policies, warranty information, and customer profiles; and a control circuit coupled to the self-service kiosk and the database, the control circuit comprising a memory and configured to execute computer readable instructions stored on the memory, the computer readable instructions, when executed by the control circuit, causing the self-service kiosk to:

display to the customer a first prompt on the user interface to provide an identifier relating to the purchase transaction in which the item was previously purchased, wherein the identifier correlates the item to be returned with the previous return purchase transaction by the customer, wherein the identifier comprises at least one of an image of a purchase receipt, an e-receipt, an order number, a customer number, a UPC code, a credit card number, a telephone number, an email address, and a mailing address;

obtain from the customer, via the user interface or from the reader, the identifier relating to the purchase transaction in which the item was previously purchased;

display a second prompt on the user interface to provide a selection identifying the item from the purchase transaction to be returned;

obtain from the customer, via the user interface or from the reader, the selection identifying the item from the purchase transaction to be returned;

display a third prompt on the user interface to provide a reason for the item to be returned;

obtain from the customer, via the user interface, the reason for the item to be returned;

display a fourth prompt on the user interface to select a preferred tender for the return transaction;

obtain from the customer, via the user interface, a selection of the preferred tender for the return transaction;

automatically authorize without assistance of any employee of the retailer the return by analyzing data relating to at least one of purchase transactions, product information, store policies, warranty information, and customer profiles, wherein authorizing the return does not require assistance by a store worker; and display instructions to the customer on the user interface for delivering the item to an unattended drop-off location in the retail facility where the kiosk is located, wherein the item is retrieved by an employee of the retailer at a time subsequent to the time of drop-off, wherein the reader comprises at least one of a barcode reader and an image scanner, and the computer readable instructions, when executed by the control circuit, enable the customer to perform the entire return transaction independently using the self-service kiosk such that the entire return transaction can be completed by the customer in the retail facility using only the self-service kiosk.

2. The system of claim 1, wherein the location of the retail facility where the item is to be returned is different from a location of a retail facility from which the item was purchased.

3. The system of claim 1, wherein the self-service kiosk further comprises a printing device, and when the return transaction is authorized, the control circuit causes the printing device to print a return label comprising a unique identifier relating to the return transaction.

4. The system of claim 3, wherein the control circuit is further configured to provide instructions to the customer to affix the return label to the item and to deliver the item to the unattended drop-off area of the retail facility.

5. The system of claim 1, wherein the control circuit is further configured to provide an alert to a store worker when at least one condition is satisfied.

6. A method for processing an in-store merchandise return transaction for a retail item purchased by a customer in-store from one of a plurality of retail facilities of a retailer using a fully automated in-store self-service kiosk located within one of the plurality of retail facilities, wherein the kiosk is not staffed by any employee of the retailer and is located in an area of the retail facility accessible by the customer in possession of the item, the self-service kiosk comprising a reader configured to identify a purchase transaction of the item to be returned, and a user interface configured to allow a customer to enter information using the reader or a touchscreen display relating to the purchase transaction the item to be returned, the method comprising:

by a control circuit coupled to the self-service kiosk, the control circuit comprising a memory and configured to execute computer readable instructions stored on the memory:

displaying to the customer a first prompt on the user interface to provide an identifier relating to the purchase transaction in which the item was previously purchased, wherein the identifier correlates the item to be returned with the previous return purchase transaction by the customer, wherein the identifier comprises at least one of an image of a purchase receipt, an e-receipt, an order number, a customer number, a UPC code, a credit card number, a telephone number, an email address, and a mailing address;

obtaining from the customer, via the user interface, the identifier relating to the purchase transaction in which the item was previously purchased;

displaying a second prompt on the user interface to provide a selection identifying the item from the purchase transaction to be returned;

obtaining from the customer, via the user interface or from the reader, the selection identifying the item from the purchase transaction to be returned;

displaying a third prompt on the user interface to provide a reason for the item to be returned;

obtaining from the customer, via the user interface, the reason for the item to be returned;

displaying a fourth prompt on the user interface to select a preferred tender for the return transaction;

obtaining from the customer, via the user interface, a selection of the preferred tender for the return transaction;

authorizing the return without assistance of any employee of the retailer by analyzing data relating to at least one of purchase transactions, product information, store policies, warranty information, and customer profiles, said data being contained in a database, wherein authorizing the return does not require assistance by a store worker; and displaying instructions to the customer on the user interface for delivering the item to an unattended drop-off location in the retail facility where the kiosk is located, wherein the item is retrieved by an employee of the retailer at a time subsequent to the time of drop-off, wherein the reader comprises at least one of a barcode reader and an image scanner, and the computer readable instructions, when executed by the control circuit, enable the customer to perform the entire return transaction independently using the self-service kiosk such that the entire return transaction can be completed by the customer in the retail facility using only the self-service kiosk.

7. The method of claim 6, wherein the location of the retail facility where the item is to be returned is different from a location of a retail facility from which the item was purchased.

8. The method of claim 6, further comprising causing a printing device associated with the self-service kiosk to print a return label comprising a unique identifier relating to the return transaction.

9. The method of claim 8, further comprising providing instructions to the customer to affix the return label to the item and to deliver the item to the unattended drop-off area of the retail facility.

10. The method of claim 6, wherein the control circuit is further configured to provide an alert to a store worker when at least one condition is satisfied.

* * * * *